United States Patent [19]
Adams

[11] Patent Number: 5,255,975
[45] Date of Patent: Oct. 26, 1993

[54] LOW COST CALIBRATION SYSTEM FOR FREQUENCY VARYING TEMPERATURE SENSING MEANS FOR A THERMOSTAT

[75] Inventor: John T. Adams, Minneapolis, Minn.

[73] Assignee: Honeywell Inc., Minneapolis, Minn.

[21] Appl. No.: 798,453

[22] Filed: Nov. 26, 1991

[51] Int. Cl.⁵ .............................................. G01K 15/00
[52] U.S. Cl. ........................................ 374/601; 165/12; 236/DIG. 8; 364/571.03
[58] Field of Search ........................... 374/1; 73/1 R; 364/571.03; 236/DIG. 8

[56] References Cited

U.S. PATENT DOCUMENTS

| | | |
|---|---|---|
| Re. 32,960 | 6/1989 | Levine .................................. 364/557 |
| Re. 33,119 | 11/1989 | Baker ............................... 364/557 X |
| 3,906,391 | 9/1975 | Murdock . |
| 4,041,382 | 8/1977 | Washburn ........................ 374/1 X |
| 4,125,023 | 11/1978 | Amemiya et al. . |
| 4,369,352 | 1/1983 | Bowles ............................. 374/1 X |
| 4,377,346 | 3/1983 | Beaver et al. ......................... 374/1 |
| 4,497,586 | 2/1985 | Nelson . |
| 4,505,600 | 3/1985 | Suzuki et al. . |
| 4,627,745 | 12/1986 | Rider . |
| 4,841,458 | 6/1989 | Levine et al. . |
| 4,854,723 | 8/1989 | Her . |

Primary Examiner—Daniel M. Yasich
Attorney, Agent, or Firm—Ian D. MacKinnon

[57] ABSTRACT

Low cost temperature sensor for thermostats utilizing a calibration resistor and a microprocessor with switchable ports wherein said microprocessor selects between high impedance input or an output for a temperature sensing element and a calibration resistor where by selecting the input, the temperature sensing element or the calibration resistor are effectively removed from the circuit thus allowing the low cost temperature sensor to self calibrate itself.

6 Claims, 2 Drawing Sheets

LOW COST CALIBRATION SYSTEM FOR FREQUENCY VARYING TEMPERATURE SENSING MEANS FOR A THERMOSTAT

BACKGROUND OF THE INVENTION

The present invention relates to electronic thermostats which utilize frequency comparison to determine temperature. More particularly, the present invention is a low cost calibration system for calibrating the variable frequency input of a frequency comparing thermostat.

The analog-to-digital convertors that are used to sense room temperature in current thermostat designs have calibration problems. Either they do not have dynamic calibration for correcting errors in the system due to changes in temperature and aging of the hardware; or for designs which do have dynamic calibration for self-calibration, the self-calibrating means is expensive and the additional components take up valuable printed wiring board space.

Electronic thermostats which utilize frequency comparison means in order to determine the current room temperature are commonly used. An example of one such system is illustrated in U.S. Pat. No. Re32,960, entitled "Electronic Thermostat", issued to Michael R. Levine, and is hereby incorporated by reference. The Levine et al. system illustrated in U.S. Pat. No. Re32,960 is sensitive to errors which would be introduced due to shifts in component performance due to aging and temperature changes. Systems which have been utilized to correct for such errors utilize additional components and thereby increase the cost and the space required on the printed wiring board for the circuit.

SUMMARY OF THE INVENTION

The invention is a low cost self-calibrating temperature sensor utilizing frequency comparison for a thermostat. The present invention illustrates a means by which the temperature sensing circuit utilized in providing a variable frequency dependent upon the ambient temperature, can be calibrated. Some microprocessors have ports that can be selected as inputs or outputs, an input port has an extremely high impedance. Due to this characteristic, it is possible to interchangeably place a thermistor, a sensing element or its equivalent, and a calibration resistor into the variable frequency oscillator circuit. By electrically connecting a first port to the thermistor and electrically connecting a second port to a calibration resistor, and then electrically connecting the opposing ends of both the calibration resistor and the thermistor together, the microprocessor can select between the thermistor and the calibration resistor. The calibration resistor and the thermistor are further electrically connected to the oscillator circuit. By switching the first port and the second port from input to output and output to input, the microprocessor selects which resistive means is being utilized in the frequency generator circuit. The high input impedance mode, which most microprocessors, utilize,.effectively removes a resistor from the oscillation circuit when a resistor is electrically connected to an input mode. Thus, the first port, if it is selected as an input while the second port is an output, removes the sense element from the circuit and places the calibration resistor into the circuit and the circuit is thereby calibrated. Through use of this invention there are essentially only two errors which will be present in the device after calibration, the initial tolerance of the calibration resistor and the initial tolerance on the thermistor, all other errors are essentially eliminated.

DESCRIPTION OF THE PREFERRED EMBODIMENT

Figure 1:
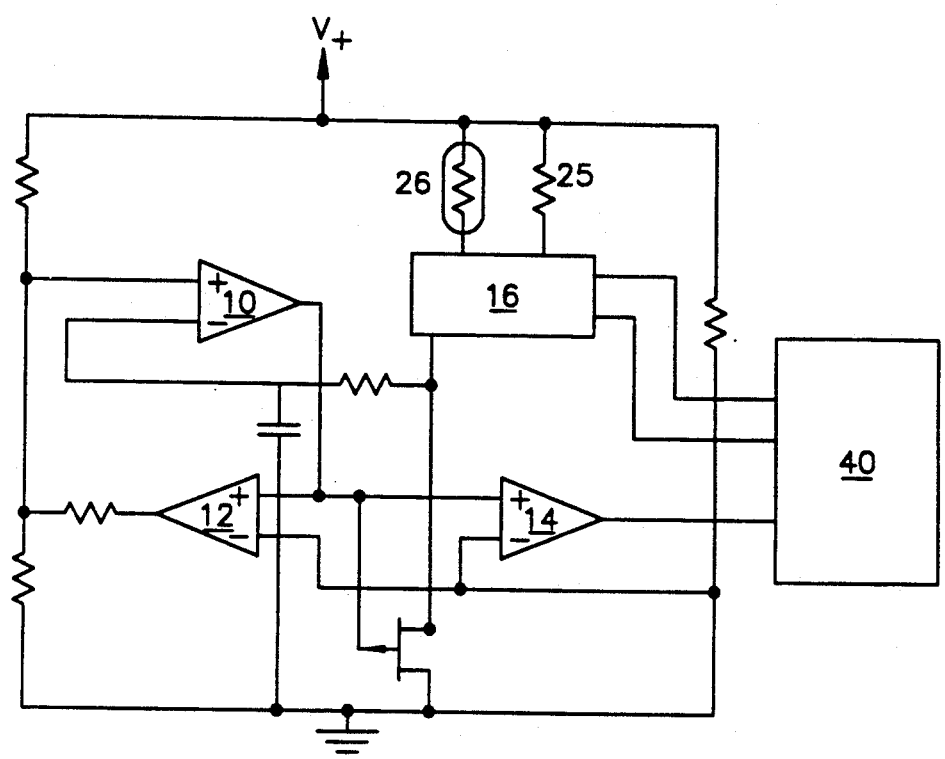
FIG. 1 illustrates a current calibration system for a variable frequency temperature detection system.

FIG. 1 demonstrates one method which is currently being used as a temperature sensitive self-calibrating sensor for thermostats currently on the market. Comparators 10, 12 and 14 are utilized to sense thresholds and MC14052 analog multiplexer 16 is utilized to select between calibration resistor 25 and sense resistor 26. Sense resistor 26 for this embodiment is a NTC thermistor, however, any electrical device which varies resistance over temperature in a calculatable manner may be used. Comparators 10, 12 and 14 comprise three of the four quad comparators available on a LP339 quad comparator. The present invention proposes a means to eliminate both LP339 quad comparators 10, 12 and 14 and multiplexer 16.

Most microprocessors have ports which can be selected as inputs or outputs. These switchable ports can thereby be utilized as multiplexers. By making a port an input, the resistor that is connected to it is effectively no longer in the circuit. This is due to the fact that when one selects a port as an input, most microprocessors design these ports to have a high input impedance mode. Thus, port C in FIG. 2 can be set as an input port while port B is an output port. This puts sense element 26 in the circuit and removes calibration element 25 from the circuit. Calibration element 25 for this embodiment is a calibration resistor with an error no greater than 1%. Port B is then switched to an input and port A an output, placing calibration resistor 25 in the circuit of operation and removing sense element 26 from the circuit.

Figure 2:
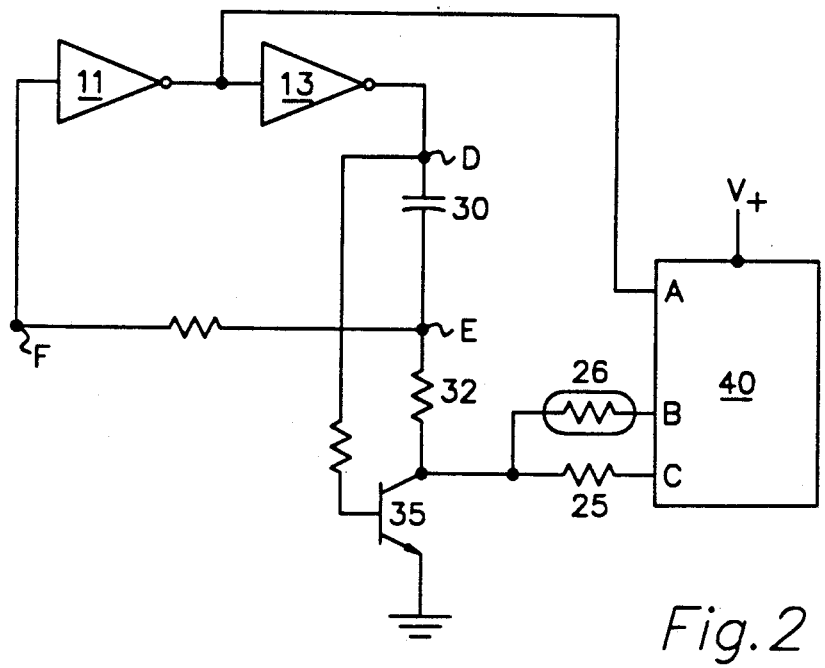
FIG. 2 illustrates a first embodiment of the invention in which spare nodes to a Hex Schmidt inverter are utilized, thereby reducing the parts count.

The embodiment of FIG. 2 is made up of microprocessor 40 which has ports which are selectable as input or output ports as described previously. It further comprises sense resistor 26 which, for this embodiment, is an NTC thermistor; however, any electrical device which varies resistance over temperature in a calculatable manner may be used. Sense resistor 26 has a first end electrically connected to port B of microprocessor 40. Calibration resistor 25 for this embodiment is a precision resistor with an error of +/− 1% and has a first end electrically connected to port C of microprocessor 40. The second end of both sense resistor 26 and calibration resistor 25 are electrically connected and then are electrically connected to the collector of transistor 35, transistor 35 being a NPN bipolar junction transistor (BJT). The collector of transistor 35 is then electrically connected to the first end of resistor 32, the second end of resistor 32 being electrically connected to the first end of capacitor 30, which shall be referred to as node E. The second end of capacitor 30 being electrically connected to the output of inverter 13, the output of inverter 13 also being electrically connected through a resistive load to the base of transistor 35. The emitter of transistor 35 is electrically connected to ground. Node E is electrically connected through a resistive means to node F, node F being the input to inverter 11. The output of inverter 11 is electrically connected to the input of inverter 13 and also to the input port into microprocessor 40, which is port A. Inverters 11 and 13 are MC14584 Hex Schmidt inverters. Most thermostat designs incorporate a watchdog timer which can be made from a MC14584 Hex Schmidt inverter. The watchdog, in most designs, uses only four of the six available inverters, thus, two of the inverters can be used as shown in FIG. 2, those being inverters 11 and 13.

The circuit of FIG. 2 is an oscillator circuit whose frequency output is a function of the thermistor resistance. In a first configuration, port C is an input and port B is an output set at a logic high level (+5V). Assume capacitor 30 is discharged and node D is high. The voltage seen at node F is the same as the voltage at node D. This is due to capacitor 30 being discharged at this time (both node D and F are at +5V). Transistor 35 is "on" and resistor 32 and sense element 26 are held to ground, thus allowing capacitor 30 to charge through resistor 32. When the voltage on capacitor 30 at node E decreases to a level below the threshold required for Schmidt trigger 11 to switch, the output at node D will go low, and will in turn shut off transistor 35. Now capacitor 30 will charge through resistor 32 and sense element 26. When node E reaches the high threshold of Schmidt trigger 11, the output will switch Schmidt trigger 11 and will force node D high and the cycle is then repeated. As capacitor 30 is continually charged and discharged, the input to microprocessor 40 at node A will be a periodic digital signal. The frequency of the input is a variable frequency dependent upon the resistance of sense element 26. In order to calibrate this system and thereby remove any errors, other than those due to the initial tolerance of sense element 26 and calibration resistor 25, node B is selected as an input and C as an output. This places calibration resistor 25 in the circuit and removes sense resistor 26. Thus, a known resistance is applied to the circuit and microprocessor 40 can adjust accordingly. By imposing a "known" resistance into the circuit it is possible to calibrate the oscillator and account for any errors in the system due to ageing and temperature variations. This is accomplished by the microprocessor accounting for the errors in its calculations of the ambient temperature. Therefore, when the temperature variable sensor is utilized, the circuit is only measuring changes due to variation of the temperature sensitive element. For the preferred embodiment, calibration resistor 25 is used for calibration cycle once every 10 minutes, thereby eliminating any errors which may be due to temperature changes or aging of all of the components, with the exception of the thermistor. By having a known calibration resistor 25 in the circuit, any variations that occur due to the ambient conditions can be eliminated.

The multiplexer feature which is offered by some microprocessors, as previously explained, can be achieved by utilizing open drain outputs. For particular circuits shown in FIG. 2, it is required that the outputs go high (V+) when they are in the circuit and then go to a high impedance state when they are out of the circuit. A microprocessor with an open collector P-channel output thereby provides the high impedance port.

Figure 3:
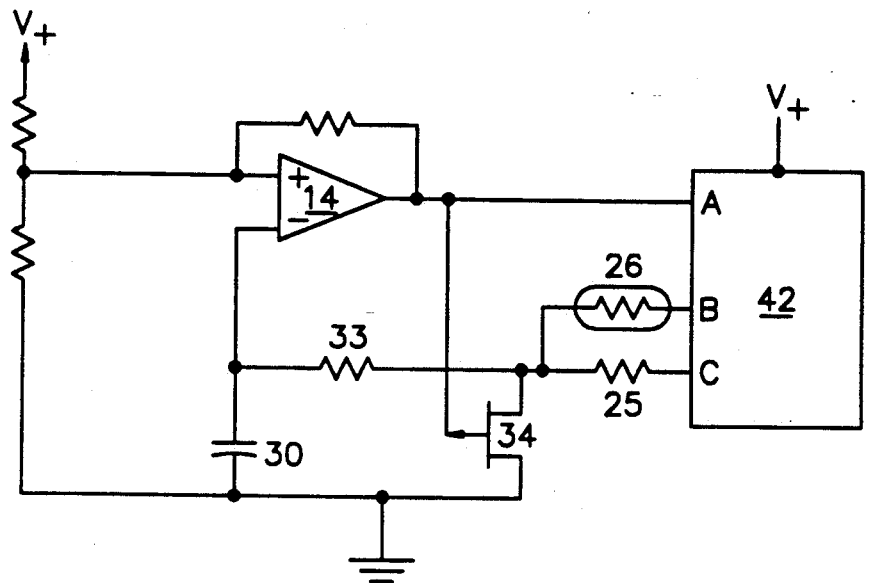
FIG. 3 illustrates an embodiment whereby a single comparator is utilized to achieve calibration.

FIG. 3 demonstrates a means by which a single comparator is utilized to achieve the same results as that shown in FIG. 2. This approach is possible as several microprocessors which are manufactured to provide on-board comparators. Comparator 14 is electrically connected to tank capacitor 30. Tank capacitor 30 is discharged and charged utilizing resistor 33. Transistor 34 is enabled and disabled utilizing comparator 14. When transistor 34 is enabled, capacitor 30 discharges through resistor 33 and transistor 34. When transistor 34 is disabled, capacitor 30 is charged through resistor 33 and either temperature sensitive element 26 or calibration element 25, as selected by microprocessor 42. Utilizing the design of FIG. 3, it is possible to achieve an even smaller parts count than that shown in FIG. 2 while achieving the same result.

Figure 4:
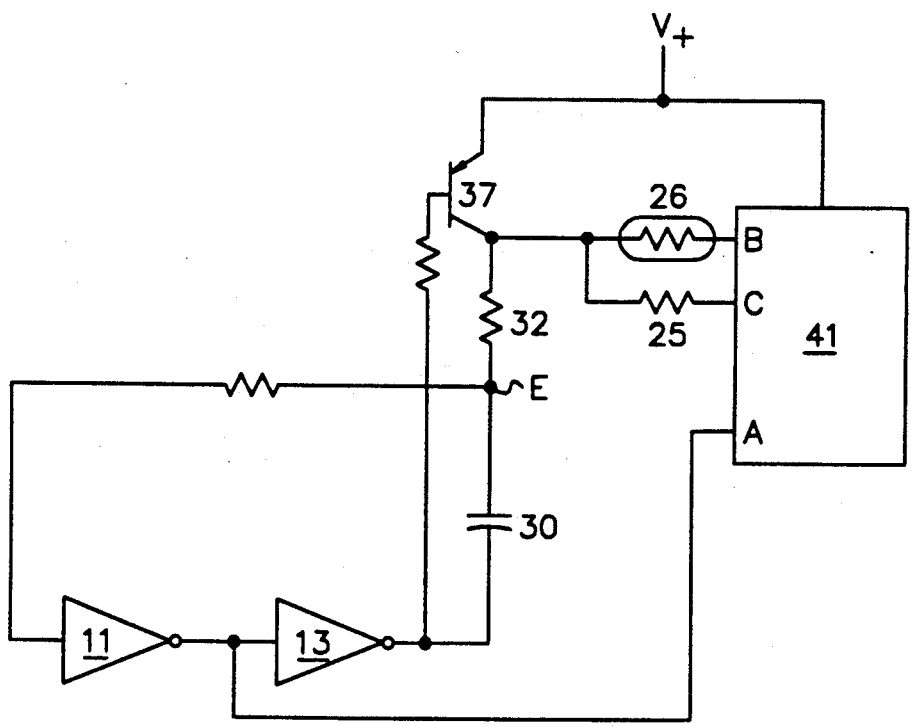
FIG. 4 illustrates a second embodiment of FIG. 2 which utilizes a microprocessor with an open collector N-channel output.

The Seiko SMC621A microprocessor is capable of utilizing an open collector N-channel port. A circuit similar to the circuit in FIG. 2 is illustrated in FIG. 4. When either node B or C is selected as an output, the node will be pulled to ground. In the input stage, microprocessor 41 will provide an open collector which is, in effect, a high impedance input. The circuit shown in FIG. 4 is a modification of the circuit shown in FIG. 2 and operates in a similar manner as FIG. 2; however, instead of utilizing an NPN transistor, a PNP transistor is utilized and the emitter is electrically connected to the supply voltage V+.

I claim:

1. A self-calibrating thermostat for controlling the application of electrical power to a temperature modifying load, said thermostat utilizing a variable frequency signal having a characteristic dependent upon the ambient temperature to calculate the ambient temperature, comprising:

a microprocessor having first and second selectable ports, said ports capable of being selected as input or output, said input being a high impedance; and means for generating a variable frequency signal having a characteristic which varies as a function of the ambient temperature, said means comprising an oscillator having a temperature dependent element, said temperature dependent element having a variable resistance dependent upon the ambient temperature wherein the frequency of the oscillator varies with respect to the variable resistance, and said oscillator further having a resistive calibration element, a first end of said temperature dependent element electrically connected to said first port and a first end of said calibration element electrically connected to said second port, a second end of said temperature dependent element electrically connected to a second end of said calibration element, said microprocessor interchangeably selecting said calibration element or said temperature dependent element by interchangeable selecting said first port and said second port as an input or an output port.

2. The thermostat of claim 1 wherein said variable frequency source further comprises a pair of inverters and a tank capacitor, wherein said tank capacitor is charged and discharged through either said temperature sensitive element or said calibration element as selected by said microprocessor, said capacitor providing a second signal to said pair of inverters representative of said charge on said capacitor, whereby said pair of inverters provide said variable frequency to said microprocessor.

3. The thermostat of claim 2 wherein said input port of said microprocessor comprise an open collector port.

4. The thermostat of claim 1 wherein said variable frequency source further comprises a comparator and a tank capacitor, whereby said tank capacitor is charged and discharged utilizing said temperature sensitive element or said calibration element as selected by said microprocessor, said charging and discharging of said tank capacitor providing an oscillating signal to said comparator, said comparator providing a variable frequency to said microprocessor.

5. The thermostat of claim 4 wherein said input port of said microprocessor comprise an open collector port.

6. A self-calibrating temperature sensor, said sensor calculating ambient temperature by providing a variable frequency signal wherein the frequency is dependent upon the ambient temperature, said sensor comprising:

a microprocessor having first and second selectable ports, said ports capable of being selected as input or output, said input being a high impedance; and means for generating a variable frequency signal having a characteristic which varies as a function of the ambient temperature, said means comprising an oscillator having a temperature dependent element, said temperature dependent element having a variable resistance dependent upon the ambient temperature wherein the frequency of the oscillator varies with respect to the variable resistance, and said oscillator further having a resistive calibration element, a first end of said temperature dependent element electrically connected to said first port and a first end of said calibration element electrically connected to said second port, a second end of said temperature dependent element electrically connected to a second end of said calibration element, said microprocessor interchangeably selecting said calibration element of said temperature dependent element by interchangeable selecting said first port and said second port as an input or an output port.

* * * * *

UNITED STATES PATENT AND TRADEMARK OFFICE
CERTIFICATE OF CORRECTION

PATENT NO. : 5,255,975
DATED : October 26, 1993
INVENTOR(S) : John T. Adams

It is certified that error appears in the above-identified patent and that said Letters Patent is hereby corrected as shown below:

Column 6, line 20, cancel "of" and substitute --or--.

Signed and Sealed this

Thirtieth Day of August, 1994

Attest:

BRUCE LEHMAN

*Attesting Officer*  *Commissioner of Patents and Trademarks*